Ozymandias (12) United States Patent
Ramalingam et al.

(10) Patent No.: US 8,661,451 B1
(45) Date of Patent: Feb. 25, 2014

(54) MULTI-PROGRAMMING-LANGUAGE SERVICE DATA OPTIMIZATION

(75) Inventors: Harsha Ramalingam, Kirkland, WA (US); Mukul V. Karnik, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/607,169

(22) Filed: Sep. 7, 2012

(51) Int. Cl.
*G06F 13/00* (2006.01)

(52) U.S. Cl.
USPC ............................ 719/312; 719/314; 719/328

(58) Field of Classification Search
USPC ......................................... 719/312, 314, 328
See application file for complete search history.

(56) References Cited

U.S. PATENT DOCUMENTS 7,774,746 B2 * 8/2010 Mansfield et al. ............. 717/106
8,332,828 B2 * 12/2012 Vargas .......................... 717/137

* cited by examiner

*Primary Examiner* — Andy Ho
(74) *Attorney, Agent, or Firm* — Hope Baldauff, LLC (57) ABSTRACT

A sending process maintains a sending process language-specific object in memory in a format that is dictated by a programming language utilized to implement the sending process. The sending process is also configured to cause the sending process language-specific object to be translated to a receiving process language-specific object. The receiving process language-specific object is in a format that is dictated by a programming language utilized to implement a receiving process. The sending process might also expose an application programming interface or another mechanism through which the receiving process can provide data indicating the programming language with which the receiving process has been programmed. The receiving process language-specific object is then transmitted to the receiving process. The receiving process can utilize the receiving process language-specific object directly without deserializing the received object.

21 Claims, 8 Drawing Sheets

MULTI-PROGRAMMING-LANGUAGE SERVICE DATA OPTIMIZATION

BACKGROUND

Distributed services are typically architected to return data to calling clients in a manner that is neutral to the programming languages that may be utilized to implement the calling clients. Configuring distributed services in this way enables the developers of the distributed services to concentrate on how the returned data is produced, rather than focusing on how the calling clients will consume the returned data.

In order for a service to return data that is neutral to the programming languages that might be utilized to implement calling clients, returned data is typically neutralized using an exchange format, such as the Extensible Markup Language ("XML") and JAVASCRIPT Object Notation ("JSON"). The format conversion is an overhead often implemented in frameworks utilized to manage remote communication between clients and services. These frameworks may assist with the serialization and deserialization of data returned from a service to a client, and vice-versa.

The serialization of data into a neutral format typically involves serializing data objects into a neutral format so that the objects are implementation neutral. Deserialization typically involves converting the objects from the neutral format to a client native format. Serialization and de-serialization might also involve capturing and carrying associated metadata for conversion and casting so that the returned data can be rendered in a client native form for consumption by a calling client. These processes can, however, be very computationally expensive, especially when large amounts of data are serialized and deserialized.

It is with respect to these and other considerations that the disclosure made herein is presented.

DETAILED DESCRIPTION

The following detailed description is directed to technologies for multi-programming-language service data optimization for remote clients. Through an implementation of the concepts and technologies disclosed herein, a distributed service can be configured to transmit objects to clients in a manner that does not require the clients to deserialize the objects prior to use. Clients might also be similarly configured to transmit objects to services in a manner that does not require the services to deserialize the objects prior to use.

According to aspects presented herein, a sending process, such as a distributed service, is configured to receive data from a receiving process, such as a client of the distributed service, which identifies the programming language that was used to program the receiving process. For instance, the sending process might expose an application programming interface ("API") through which a receiving process can indicate the programming language utilized to implement the receiving process.

The sending process may utilize the data identifying the programming language utilized to program the receiving process to translate objects for use by the receiving process without deserialization. For example, the sending process might utilize the data to select a library configured for translating objects maintained by the sending process in a format that is specific to the language utilized to program the sending process (referred to herein as "sending process language-specific objects") to objects in a format that is specific to the programming language utilized to program the receiving process (referred to herein as "receiving process language-specific objects"). Because receiving process language-specific objects are in the format utilized by the programming language utilized to implement the receiving process, these objects do not need to be deserialized prior to use.

More particularly, a sending process might maintain sending process language-specific objects in memory according to a memory map defined by a programming language utilized to program the sending process. A receiving process might similarly maintain receiving process language-specific objects in memory according to a different memory map that is defined by the programming language utilized to program the receiving process. The libraries described above might be configured to translate sending process language-specific objects constructed according to a memory map used by one programming language (i.e. the programming language used to implement the sending process) to receiving process language-specific objects constructed according to memory maps used by other programming languages (i.e. the programming languages utilized to implement receiving processes).

Once a sending process language-specific object has been translated to a receiving process language-specific object, the receiving process language-specific object may be transmitted to the receiving process for use without deserializing the object. For instance, a binary large object ("BLOB") form of the receiving process language-specific object might be streamed to the receiving process. The receiving process can then place the receiving process language-specific object in memory and utilize the object without deserializing the object. As will be described below, other mechanisms might also be utilized to transmit a receiving process language-specific object from a sending process to a receiving process.

According to another aspect, a sending process might be configured to maintain and/or utilize a cache containing receiving process language-specific objects for storing receiving process language-specific objects configured for use with various programming languages. More particularly, for a particular sending process language-specific object, a sending process might maintain and/or utilize a cache containing a multitude of receiving process language-specific objects. Each of the receiving process language-specific objects might be formatted according to a memory map defined by a different programming language utilized to program a receiving process. Based upon the programming language utilized to program a particular receiving process, the sending process can identify and retrieve the appropriate receiving process language-specific object for the receiving process. The receiving process language-specific object retrieved from the cache can then be transmitted to the receiving client in the manner described above.

According to another aspect, receiving process language-specific objects might be transmitted to receiving processes in a one-way communications mechanism that utilizes queues. For instance, a sending process might store receiving process language-specific objects on language-specific queues associated with programming languages utilized to program receiving processes. In turn, the receiving processes can retrieve a receiving process language-specific object by dequeing the object from the queue corresponding to the programming language utilized to program the receiving process. The receiving processes can then utilize the dequeued receiving process language-specific objects without deserialization in the manner described above.

It should be appreciated that the embodiments disclosed herein might be utilized with any type of computer, computing system, device, application program, operating system, or other type of system or component. Accordingly, although the embodiments disclosed herein are primarily presented in the context of a distributed service that embodies the concepts disclosed herein for multi-programming-language service data optimization for remote clients, the disclosure presented herein is not limited to such an implementation. Moreover, although the embodiments disclosed herein are primarily presented in the context of service-to-client data transmission, the technologies disclosed herein might also be applied to client-to-service data transmission.

It should be also appreciated that the subject matter presented herein may be implemented as a computer process, a computer-controlled apparatus, a computing system, or an article of manufacture, as a computer-readable storage medium, or in other ways. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described below, including multiprocessor systems, micro-processor-based or programmable consumer electronics, minicomputers, mainframe computers, handheld computers, personal digital assistants, tablet computers, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several FIGS.

Figure 1:
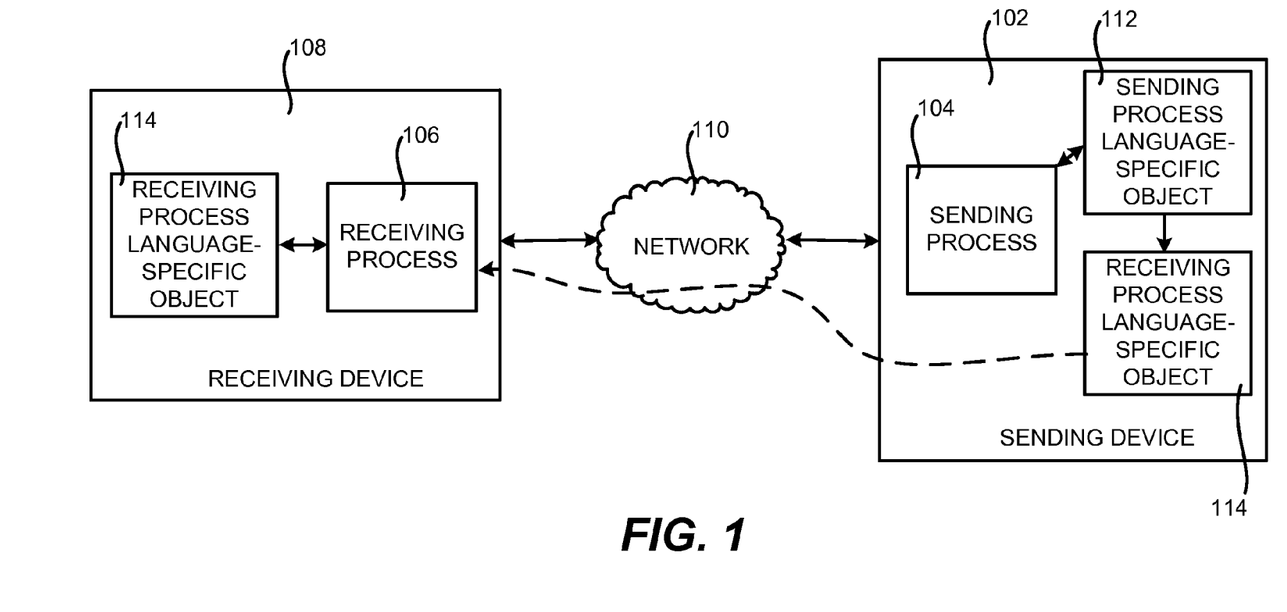
FIG. 1 is a software architecture diagram showing aspects of one mechanism for multi-programming-language service data optimization, according to one embodiment disclosed herein.

FIG. 1 is a software architecture diagram showing aspects of one mechanism for multi-programming-language service data optimization, according to one embodiment disclosed herein. As shown in FIG. 1 and described briefly above, a sending device 102 is configured to execute a sending process 104. The sending device 102 is a server computer in one embodiment, but might be virtually any type of computing device as described below with regard to FIG. 8. The sending process 104 is an executable process utilized in conjunction with a distributed service in one embodiment, but might be another type of process in other embodiments.

A receiving device 108 executing a receiving process 106 is also utilized in embodiments disclosed herein. The receiving device 108 is a server computer in one embodiment, but might be virtually any type of computing device as described below with regard to FIG. 8. The receiving process 106 executes on the receiving device 108. The receiving process 106 also receives data transmitted from the sending device 102 in the manner disclosed herein. The receiving process 106 might be a client of the distributed service provided by the sending process 104. The receiving process 106 might also be another type of executable process that receives data from a sending process 104 executing on a sending device 102. In this regard, it should be appreciated that the various embodiments disclosed herein are merely illustrative and that the technologies utilized herein might be utilized to optimize communication between other types of sending and receiving processes than those disclosed herein.

As also shown in FIG. 1, the sending device 102 and the receiving device 108 may be interconnected by one or more networks 110. The network 110 might be a local-area network ("LAN"), a wide-area network ("WAN"), the Internet, or any other networking topology known in the art that connects the sending device 102 and the receiving device 108. Multiple such networks 110 might also be utilized. In this regard, it should be appreciated that the network 110 and the configuration of both the sending device 102 and the receiving device 108 have been simplified in FIG. 1 for discussion purposes. These elements might utilize many more components than shown in FIG. 1.

According to various embodiments disclosed herein, the sending process 104 is configured to maintain one or more sending process language-specific objects 112 (which might be referred to herein as "objects 112"). The sending process language-specific object 112 is a collection of data and, potentially, one or more routines for operating on the data. The sending process language-specific object 112 is maintained in memory in a format that is dictated by the programming language utilized to program the sending process 104.

For example, if the C++ programming language is utilized to program the sending process 104, a memory map having certain characteristics defined by the C++ programming language may be utilized to store the sending process language-specific object 112 in memory. If the JAVA programming language is utilized to program the sending process 104, a memory map having different characteristics defined by the JAVA programming language may be utilized to store the sending process language-specific object 112 in memory. Other programming languages might also result in other memory maps being utilized to store the sending process language-specific object 112 in a memory of the sending device 102.

In order to transmit the sending process language-specific object 112 to the receiving process 106, the sending process 104 is configured in one embodiment to cause the sending process language-specific object 112 to be translated to a receiving process language-specific object 114 (which might be referred to herein as "objects 114"). The sending process 104 might perform the translation directly or, in other embodiments, one or more appropriate libraries are utilized to perform the translation. Other mechanisms might also be utilized to perform the translation.

It should be appreciated that the sending process 104 and the receiving process 106 might be programmed using different programming languages or the same programming language. In the case where the sending process 104 and the receiving process 106 are programmed using the same programming language, a cast operation might be utilized to translate a sending process language-specific object 112 to a receiving process language-specific object 114. Where the sending process 104 and the receiving process 106 are programmed using different programming languages, more complex translation operations might be performed.

The receiving process language-specific object 114 is a language-specific data type equivalent of a corresponding sending process language-specific object 112. More particularly, the receiving process language-specific object 114 contains the data and/or methods of the sending process language-specific object 112, but is formatted according to a memory map defined by the programming language utilized to program the receiving process 106. For instance, the receiving process language-specific object 114 might be formatted according to a memory map defined by the programming language utilized to program the receiving process 106. In order to perform this translation, various mechanisms might be provided through which the receiving process 106 can indicate the language with which it has been programmed to the sending process 104.

Once the sending process 104 has caused the sending process language-specific object 112 to be translated to the receiving process language-specific object 114, the receiving process language-specific object 114 might be transmitted to the receiving process 106 for use. For instance, the receiving process 106 might invoke one or more of the methods defined in the receiving process language-specific object 114. Because the receiving process language-specific object 114 has already been formatted according to the programming language utilized to program the receiving process 106, the receiving process language-specific object 114 can be placed into memory and utilized without deserialization. Additional details regarding these and other aspects of the technologies disclosed herein for multi-programming-language service data optimization will be provided below with regard to FIGS. 2-8.

Figure 2:
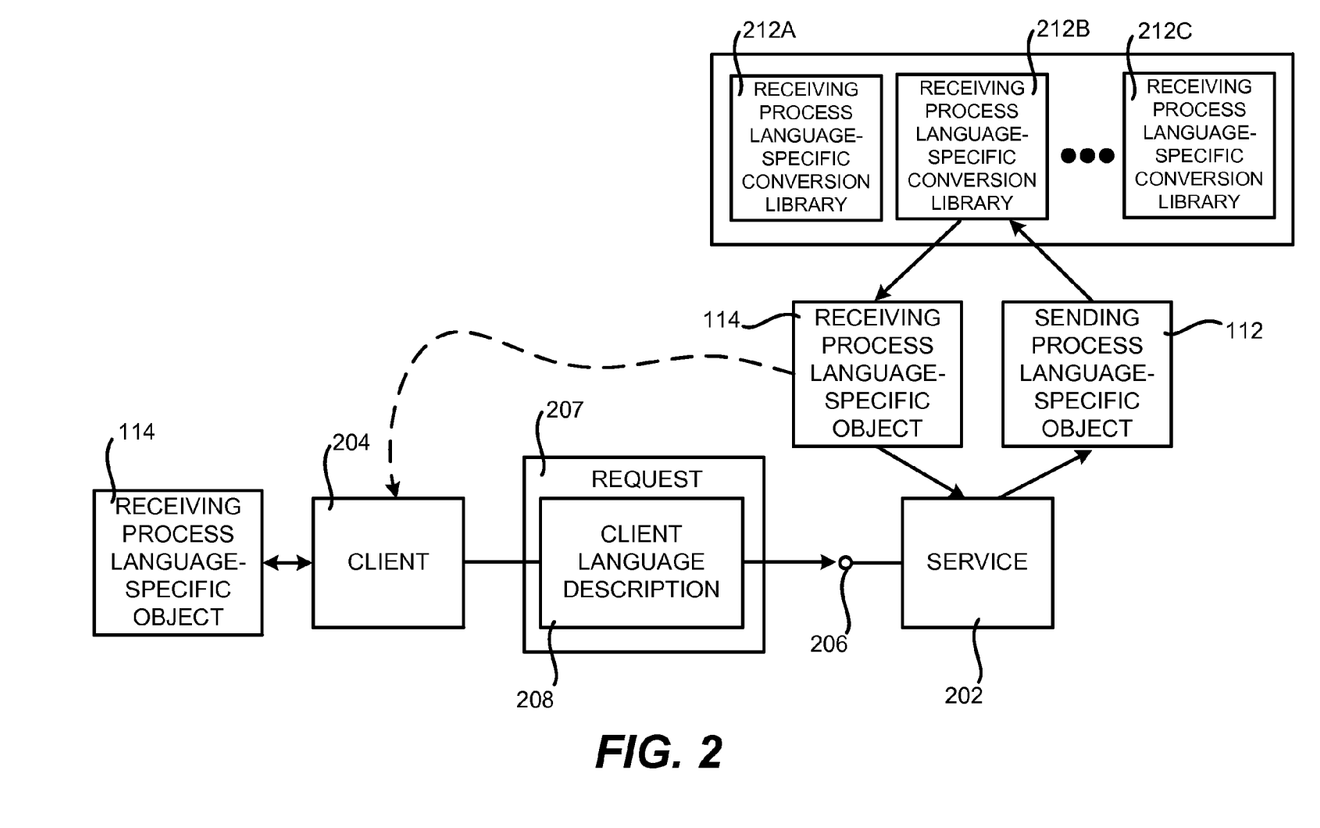
FIG. 2 is a software architecture diagram showing additional aspects of one mechanism disclosed herein for multi-programming-language service data optimization, according to one embodiment presented herein.

FIG. 2 is a software architecture diagram showing additional aspects of one mechanism disclosed herein for multi-programming-language service data optimization, according to one embodiment presented herein. In the example shown in FIG. 2, the sending process 104 is a distributed service 202 and the receiving process 106 is a client 204 of the distributed service 202. The concepts described with reference to FIGS. 2, 3A and 3B may, however, be utilized with other types of receiving and sending processes.

As shown in FIG. 2, the service 202 is configured to expose an API 206 through which the client 204 can provide a client language description 208. The client language description 208 includes data that describes the programming language utilized to program the client 204. The client language description 208 might also provide other information regarding the programming language utilized to program the client 204, such as a compiler identifier, a compiler version number, and potentially other information. The client language description 208 might be provided to the service 202 as part of a request 207. For instance, the request 207 might be a request for the receiving process language-specific object 114. The request 207 might also include information other than the client language description 208, such as an identifier of the receiving process language-specific object 114.

As will be described in greater detail below, the data contained in the client language description 208 may be utilized to translate a sending process language-specific object 112 to a receiving process language-specific object 114. It should be appreciated that other mechanisms separate from, or in addition to, the API 206 might be provided through which a client 204 can provide the information described above as being contained in the client language description 208.

As also shown in FIG. 2, the service 202 might utilize one or more receiving process language-specific conversion libraries 212A-212C. The receiving process language-specific conversion libraries 212A-212C are libraries configured to convert a sending process language-specific object 112 to a receiving process language-specific object 114. Each of the libraries 212A-212C might be configured to convert objects configured for use with programs generated with one programming language to objects configured for use with another programming language. For example, the receiving process language-specific conversion library 212B might be configured to translate a sending process language-specific object 112 formatted according to a C++ memory map to a receiving process language-specific object 114 formatted according to a JAVA memory map. The libraries 212 might also provide functionality for performing other types of conversions.

In one embodiment, only a single library 212 is utilized. In this embodiment, the library 212 is configured to convert between a base programming language and other programming languages based upon the based programming language. For instance, the library 212 might be constructed to convert objects for use with the C programming languages and other programming languages that are based upon the C programming language, such as the JAVA, C++, PERL, and PHP programming languages. Such a configuration might assist in quick deployment and utilization of the library 212.

Once the client 204 has indicated the programming language utilized to program itself through the API 206 or in another manner, the service 202 may utilize the data identifying the programming language utilized to program the client 204 to select an appropriate library 212 configured for translating an object 112 maintained by the service 202 in a format that is specific to the language utilized to program the service 202 to an object 114 in a format that is specific to the programming language utilized to program the client 204. The selected library 212 might then be utilized to translate the sending process language-specific object 112 constructed according to a memory map used by one programming language (i.e. the programming language used to implement the sending process) to a receiving process language-specific object 114 constructed according to a memory map used by the programming language utilized to program the client 204.

Once the sending process language-specific object 112 has been translated to the receiving process language-specific object 114, the receiving process language-specific object 114 may be transmitted to the client 204 for use without deserializing the object 114. For instance, and as mentioned above, a BLOB form of the receiving process language-specific object 114 might be streamed to the client 204 from the service 202 or another component. The client 204 can then place the receiving process language-specific object 114 in memory and utilize the object without deserializing the object. Other mechanisms might also be utilized to transmit a receiving process language-specific object 114 to a client 204. One such mechanism will be described below with regard to FIGS. 6, 7A and 7B.

Figure 3A:
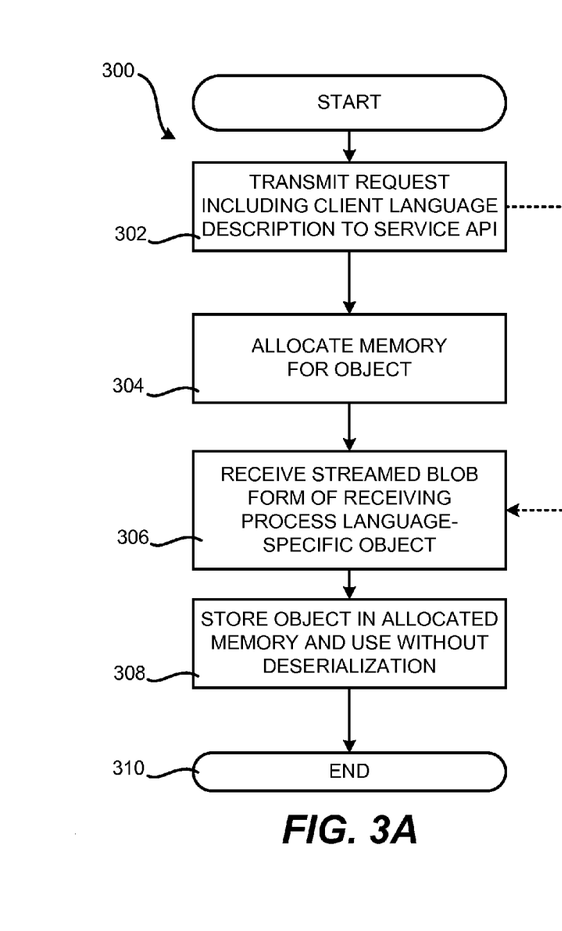
FIGS. 3A and 3B are flow diagrams showing several routines that show aspects of one illustrative mechanism for multi-programming-language service data optimization in one embodiment disclosed herein.
Figure 3B:
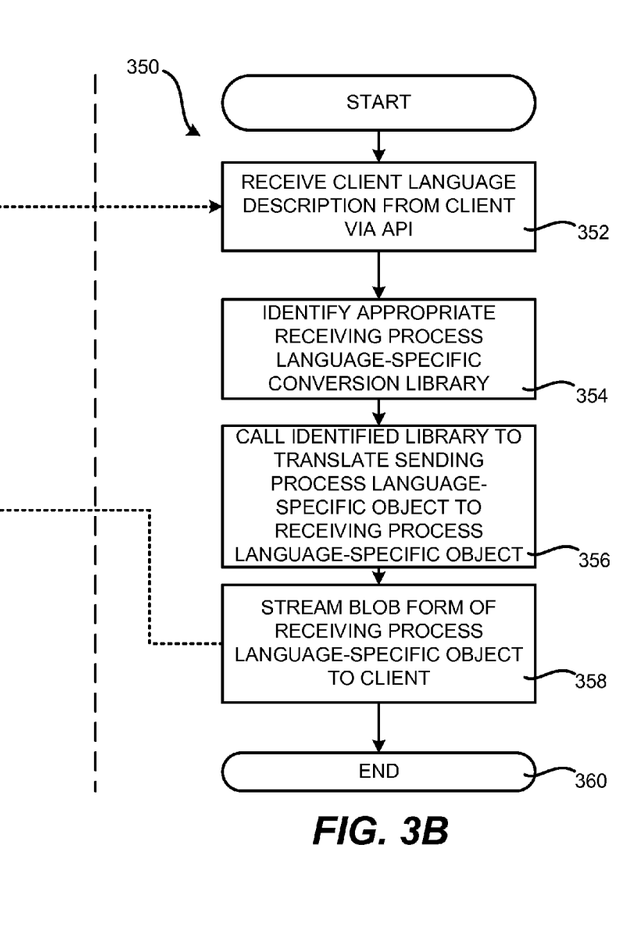

Turning now to FIGS. 3A and 3B, additional details will be provided regarding the embodiments described herein for multi-programming-language service data optimization. In particular, FIGS. 3A and 3B are flow diagrams showing several routines 300 and 350, respectively, that show aspects of one illustrative mechanism for multi-programming-language service data optimization in one embodiment disclosed herein. FIG. 3A illustrates aspects of the operation of a receiving process 106, such as the client 204, and FIG. 3B illustrates aspects of the operation of a sending process 104, such as the service 202. The routines 300 and 350 will be described together, below.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein with reference to FIGS. 3A and 3B and the other various figures are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 300 begins at operation 302, where a receiving process 106, such as the client 204, transmits the client language description 208 to an API 206 exposed by a sending process 104, such as the service 202. As discussed above, the client language description 208 might be provided as a part of a request 207 or in another manner. As also mentioned above, the client language description 208 includes data identifying the programming language utilized to program the receiving process 106. As also mentioned above, other mechanisms might also be utilized to notify a sending process 104 of the programming language utilized to program a receiving process 106.

The sending process 104 receives the client language description 208 at operation 352 of the routine 350. From operation 352, the routine 350 proceeds to operation 354, where the sending process 104 utilizes the data in the client language description 208 to identify an appropriate library 212 for translating the sending process language-specific object 112 to a receiving process language-specific object 114 compatible with the receiving process 106.

Once an appropriate library 212 has been selected, the routine 350 proceeds from operation 354 to operation 356, where the sending process 104 calls the selected library 212 to translate the sending process language-specific object 112 to the receiving process language-specific object 114. In turn, the selected library 212 performs the conversion and/or translation and returns the receiving process language-specific object 114 to the service 202.

The routine 350 then proceeds to operation 358, where the service 202 or another component transmits the receiving process language-specific object 114 to the receiving process 106. As mentioned above, a BLOB form of the receiving process language-specific object 114 may be streamed to the receiving process 106. Other transmission mechanisms might also be utilized. From operation 358, the routine 350 proceeds to operation 360, where it ends.

From operation 302, the routine 300 proceeds to operation 304, where the receiving process 106 allocates memory for the receiving process language-specific object 114. The routine 300 then proceeds to operation 306, where the receiving process 106 receives the receiving process language-specific object 114 from the service 202.

From operation 306, the routine 300 proceeds to operation 308, where the receiving process 106 stores the receiving process language-specific object 114 in the memory allocated at operation 304. The receiving process 106 can then utilize the receiving process language-specific object 114 without deserialization of the object 114. The routine 300 then proceeds from operation 308 to operation 310, where it ends.

Figure 4:
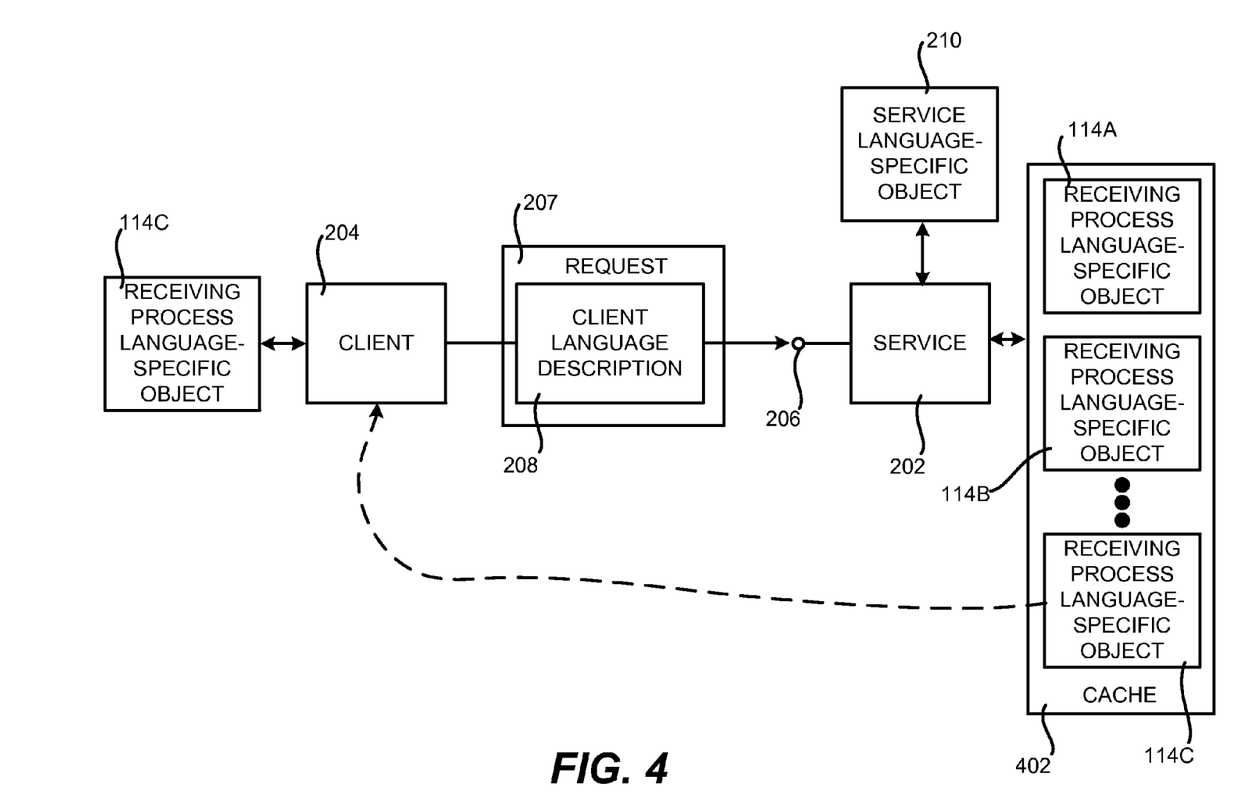
FIG. 4 is a software architecture diagram showing aspects of one mechanism for multi-programming-language service data optimization in which receiving process language-specific objects are cached, according to one embodiment presented herein.

FIG. 4 is a software architecture diagram showing aspects of one mechanism for multi-programming-language service data optimization in which receiving process language-specific objects are cached, according to one embodiment presented herein. In the example shown in FIG. 4, the sending process 104 is a distributed service 202 and the receiving process 106 is a client 204 of the distributed service 202. The concepts described with reference to FIGS. 4, 5A and 5B may, however, be utilized with other types of receiving processes 106 and sending processes 104.

As shown in FIG. 4, the service 202 might utilize a cache 402 in one embodiment to store a multitude of receiving process language-specific objects 114A-114C. The receiving process language-specific objects 114A-114B are language-specific versions of the service language-specific object 210. For example, if the service 202 is programmed using C++, the receiving process language specific object 114A might be generated for use by clients 204 programmed using JAVA, the receiving process language-specific object 114B might be generated for use by clients 204 programmed using PERL, and the receiving process language-specific object 114C might be generated for use by clients 204 programmed using PHP.

Other receiving process language-specific objects 114 might also be stored in the cache 402 for use by clients 204 programmed using other programming languages. The receiving process language-specific objects 114 stored in the cache might also be generated and stored in the cache 402 prior to the time that a request is received for the objects 114. By pre-storing the objects 114 in the cache 402, latency in responding to requests from clients 204 for the objects 114 might be reduced. The objects 114 stored in the cache 402 might be generated directly by the service 202, using the libraries 212 described above, or in another manner.

As in the examples described above, a client 204 may provide a client language description 208 to the service 202 by way of an API 206 or another mechanism. The client language description 208 might be provided as a part of a request 207 as described above. Utilizing the data contained in the client language description 208, the service 202 can identify a receiving process language-specific object 114 stored in the cache 402 that is appropriate for use by the client 204. For instance, if the client 204 has been programmed using the JAVA programming language, the service 202 may select a receiving process language-specific object 114 from the cache that has been formatted according to a JAVA-compatible memory map. In the example shown in FIG. 4, the service 202 has selected the receiving process language-specific object 114C.

Once the service 202 has selected an appropriate receiving process language-specific object 114 for the client 204, the service 202 causes the selected object 114 to be transmitted to the client 204. For instance, in the example shown in FIG. 4, the receiving process language-specific object 114C has been transmitted to the client 204. As mentioned above, a BLOB form of the object 114C may be streamed to the client 204. Other mechanisms might also be utilized to stream the object 114C to the client 204. As also discussed above, the client 204 can utilize the object 114C without deserialization. Additional details regarding the mechanism shown in FIG. 4 will be described in greater detail below with regard to FIGS. 5A and 5B.

Figure 5A:
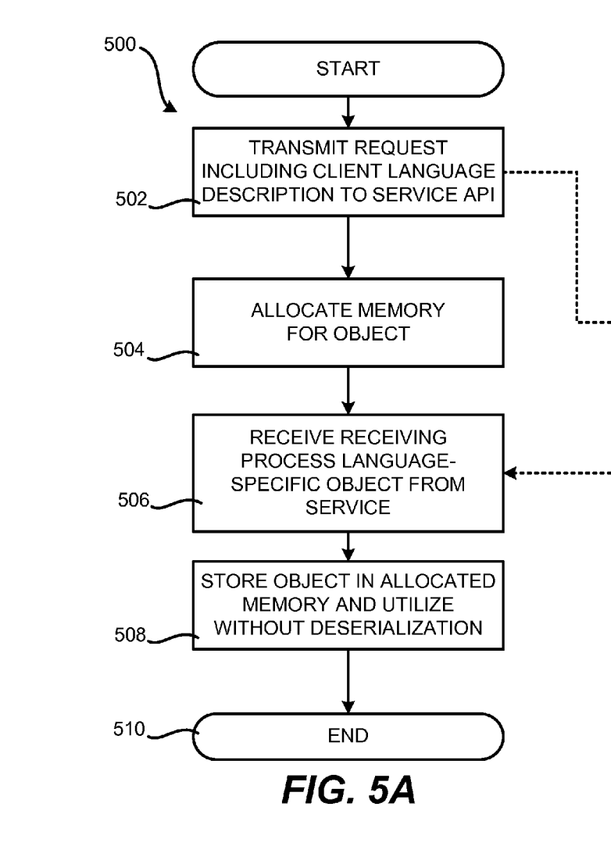
FIGS. 5A and 5B are flow diagrams showing several routines that illustrate aspects of a mechanism for multi-programming-language service data optimization in which receiving process language-specific objects are cached, according to one embodiment disclosed herein.
Figure 5B:
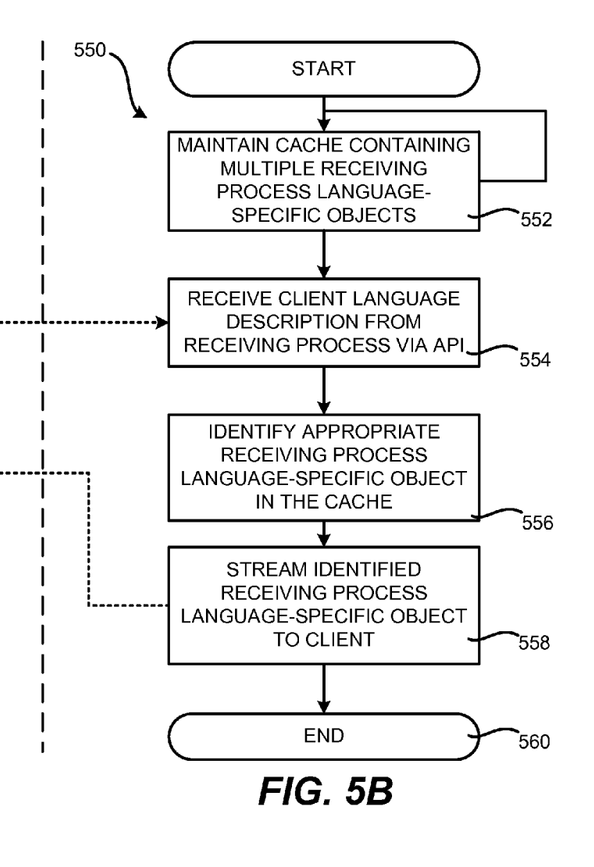

FIGS. 5A and 5B are flow diagrams showing several routines 500 and 550, respectively, that illustrate aspects of a mechanism for multi-programming-language service data optimization in which receiving process language-specific objects are cached. FIG. 5A illustrates aspects of the operation of a receiving process 106, such as the client 204, and FIG. 5B illustrates aspects of the operation of a sending process 104, such as the service 202. The routines 500 and 550 will be described together, below.

The routine 550 begins at operation 552, where a sending process 104, such as the service 202, maintains a cache 402 containing a multitude of receiving process language-specific objects 114 configured for receiving processes 106, such as the clients 204, that have been programmed using different programming languages. In this regard, the sending process 104 might periodically generate the objects 114 for one or more service language-specific objects 210 and store the objects 114 in the cache 402. As mentioned above, pre-generating the objects 114 in advance of the time they are transmitted to receiving processes 106 might reduce latency.

The routine 500 begins at operation 502, where a receiving process 106, such as the client 204, transmits the client language description 208 to an API 206 exposed by a sending process 104, such as the service 202. The client language description 208 might be transmitted, for instance, as a part of a request 207 for a receiving process language-specific object 114. As also mentioned above, the client language description 208 includes data identifying the programming language utilized to program the receiving process 106. As also mentioned above, other mechanisms might also be utilized to notify a sending process 104 of the programming language utilized to program a receiving process 106.

The sending process 104 receives the client language description 208 at operation 554 of the routine 550. From operation 554, the routine 550 proceeds to operation 556, where the sending process 104 utilizes the data in the client language description 208 to identify an appropriate receiving process language-specific object 114 that is compatible with the receiving process 106 that has been previously stored in the cache 402.

Once an appropriate receiving process language-specific object 114 has been selected from the cache 402, the routine 550 proceeds from operation 556 to operation 558, where the sending process 104 or another component transmits the identified receiving process language-specific object 114 to the receiving process 106. As mentioned above, a BLOB form of the receiving process language-specific object 114 may be streamed to the receiving process 106. Other transmission mechanisms might also be utilized. From operation 558, the routine 550 proceeds to operation 560, where it ends.

From operation 502, the routine 500 proceeds to operation 504, where the receiving process 106 allocates memory for the receiving process language-specific object 114. The routine 500 then proceeds to operation 506, where the receiving process 106 receives the receiving process language-specific object 114 from the service 202.

From operation 506, the routine 500 proceeds to operation 508, where the receiving process 106 stores the receiving process language-specific object 114 in the memory allocated at operation 504. The receiving process 106 can then utilize the receiving process language-specific object 114 without deserialization of the object 114. The routine 500 then proceeds from operation 508 to operation 510, where it ends.

Figure 6:
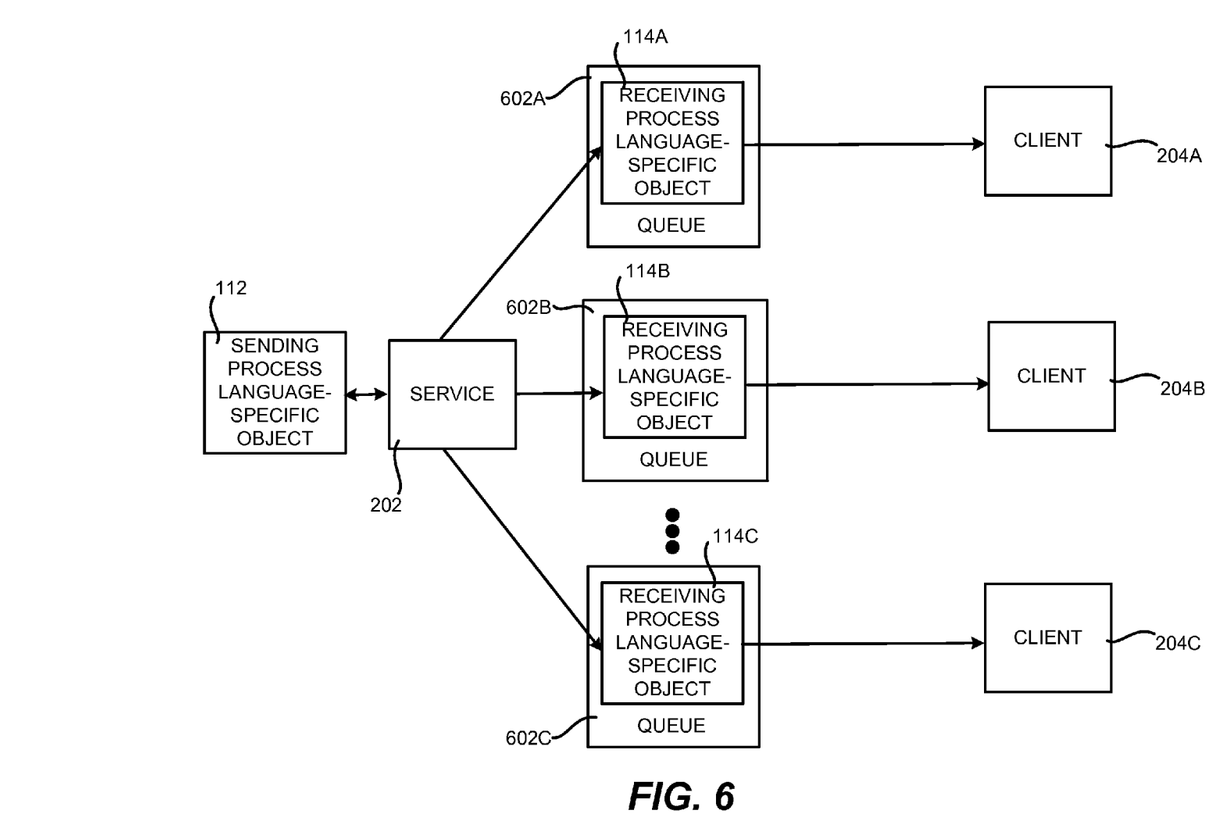
FIG. 6 is a software architecture diagram showing aspects of one mechanism for multi-programming-language service data optimization presented herein that is implemented in a one-way messaging environment, according to one embodiment disclosed herein.

FIG. 6 is a software architecture diagram showing aspects of one mechanism for multi-programming-language service data optimization presented herein that is implemented in a one-way messaging environment, according to one embodiment disclosed herein. In the example shown in FIG. 6, the sending process 104 is a distributed service 202 and the receiving process 106 is a client 204 of the distributed service 202. The concepts described with reference to FIGS. 6, 7A and 7B may, however, be utilized with other types of receiving processes 106 and sending processes 104.

As shown in FIG. 6, a sending process 104, such as the service 202, might maintain one or more messaging queues 602A-602C. The queues 602A-602C are language-specific and are configured to store receiving process language-specific objects 114 configured for use by receiving processes 106, such as the clients 204, that have been programmed with the corresponding programming language. For example, the queue 602A might be configured for storing receiving process language-specific objects 114A that have been formatted for use by receiving processes 106 that have been programmed using the C++ programming language. Similarly, the queue 602B might be configured for storing receiving process language-specific objects 114B that have been formatted for use by receiving processes 106 that have been programmed using the JAVA programming language.

In order to transmit receiving process language-specific objects 114 to receiving processes, such as the clients 204A-204C, the service 202 generates receiving process language-specific objects 114A for receiving processes 106 programmed in a multitude of languages in the manner described above. The objects 114 might be generated directly by the service 202, using the libraries 212 described above, or in another manner. The service 202 then causes the generated receiving process language-specific objects 114A-114C to be placed into the appropriate queue 602A-602C.

In the embodiment shown in FIG. 6, the clients 204A-204C are configured to dequeue a receiving process language-specific object 602 from an appropriate queue. As mentioned above, for instance, if the client 204A has been programmed using the C++ programming language, the client 204A will be configured to dequeue objects 114 from a queue 602 that stores objects that have been formatted for use by clients 204 programmed using the C++ programming language. Multiple receiving processes 106 might dequeue objects 114 from the same queue.

Once the clients 204A-204C have dequeued objects 114 from an appropriate queue 602, the objects 114 may be utilized directly without deserialization. Additional details regarding this process are provided below with regard to FIGS. 7A and 7B.

Figure 7A:
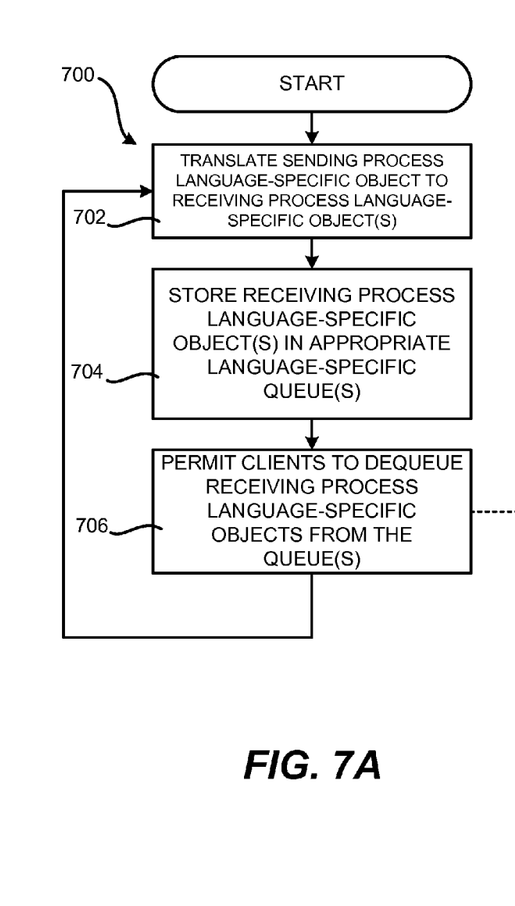
FIGS. 7A and 7B are flow diagrams showing several routines that illustrate aspects of one mechanism for multi-programming-language service data optimization implemented in a one-way messaging environment, according to one embodiment disclosed herein.
Figure 7B:
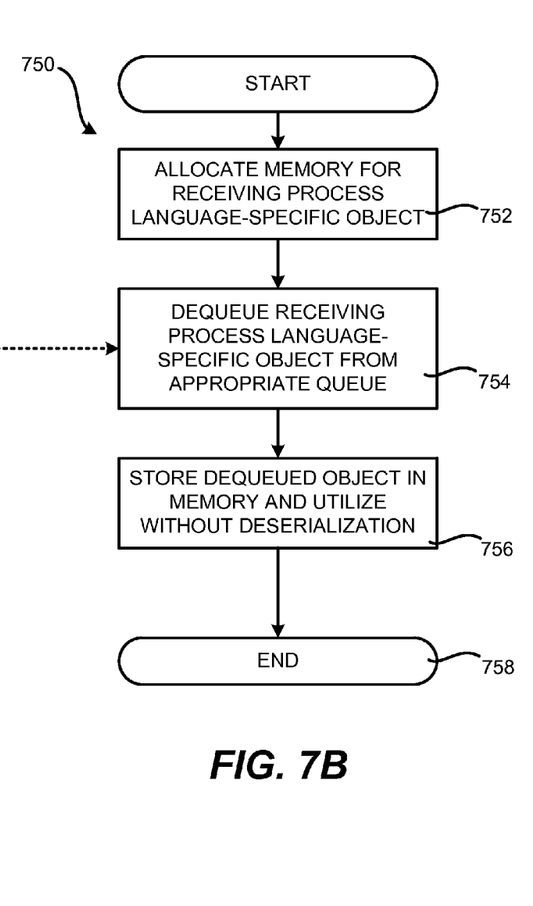

FIGS. 7A and 7B are flow diagrams showing several routines 700 and 750, respectively, that illustrate aspects of one mechanism for multi-programming-language service data optimization implemented in a one-way messaging environment. FIG. 7A illustrates aspects of the operation of a sending process 104, such as the service 202, and FIG. 7B illustrates aspects of the operation of a receiving process 106, such as the client 204. The routine 700 and 750 will be described together, below.

The routine 700 begins at operation 702, where a sending process 104, such as the service 202, causes a sending process language-specific object 112 to be translated to a multitude of receiving process language-specific objects 114. As mentioned above, the receiving process language-specific objects 114 might be formatted for use by receiving processes 106 that have been programmed using different programming languages.

From operation 702, the routine 700 proceeds to operation 704, where the sending process 104 causes the objects 114 generated at operation 702 to be stored in an appropriate language-specific queue 602. For example, objects 114 configured for use by receiving processes 106 programmed using the C++ programming language will be stored in a queue 602 configured for storing such objects 114. Objects 114 configured for use by receiving processes 106 programmed using other programming languages may be stored in other queues 602.

From operation 704, the routine 700 proceeds to operation 706 where the sending process 104 permits receiving processes 106, such as the clients 204A-204C, to dequeue objects 114 from the queues 602. For instance, the service 202 might unlock the queues 602, thereby permitting the clients 204A-204C to dequeue the objects 114 contained therein. The routine 700 then proceeds back to operation 702, where the sending process 104 might update the objects 114 stored in the queues 602.

The routine 750 begins at operation 752, where a receiving process 106, such as one of the clients 204A-204C, allocates memory for a receiving process language-specific object 114. The routine 750 then continues to operation 754, where the receiving process 106 dequeues a receiving process language-specific object 114 from the appropriate queue 602. As discussed above, for instance, a client 204A that has been programmed using the JAVA programming language will dequeue an object 114 from a queue 602 that has been configured to store objects 114 formatted for use by clients 204 that have been programmed using the JAVA programming language.

From operation 754, the routine 750 proceeds to operation 756, where the receiving process 106 stores the dequeued object 114 in the memory allocated at operation 752 of the routine 750. The receiving process 106 can then utilize the stored object 114 without deserialization of the object 114. From operation 756, the routine 750 proceeds to operation 758, where it ends.

Figure 8:
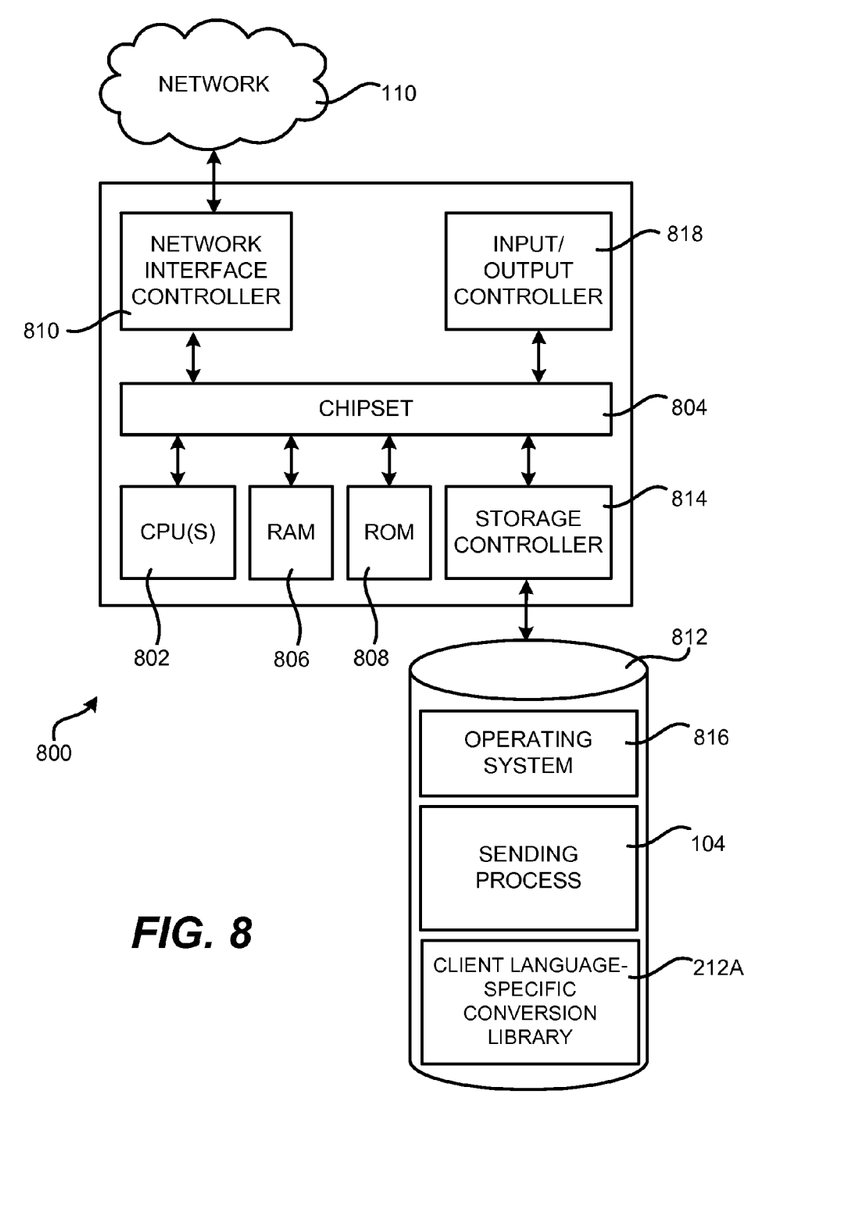
FIG. 8 is a computer architecture diagram showing one illustrative computer hardware architecture for use in implementing computing devices that can execute the various software components disclosed herein.

FIG. 8 shows an example computer architecture for a computer 800 capable of executing the software components described herein for multi-programming-language service data optimization in the manner presented above. The computer architecture 800 shown in FIG. 8 illustrates a conventional server computer, workstation, desktop computer, laptop, personal digital assistant, smartphone, electronic book reader, digital wireless phone, tablet computer, network appliance, set-top box, or other computing device, and may be utilized to execute any aspects of the software components presented herein described as executing on the sending device 102, the receiving device 108 or other computing device described herein.

The computer 800 includes a baseboard, or "motherboard," which is a printed circuit board to which a multitude of components or devices may be connected by way of a system bus or other electrical communication paths. In one illustrative embodiment, one or more central processing units ("CPUs") 802 operate in conjunction with a chipset 804. The CPUs 802 are standard programmable processors that perform arithmetic and logical operations necessary for the operation of the computer 800.

The CPUs 802 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 804 provides an interface between the CPUs 802 and the remainder of the components and devices on the baseboard. The chipset 804 may provide an interface to a random access memory ("RAM") 806, used as the main memory in the computer 800. The chipset 804 may further provide an interface to a computer-readable storage medium such as a read-only memory ("ROM") 808 or non-volatile RAM ("NVRAM") for storing basic routines that help to startup the computer 800 and to transfer information between the various components and devices. The ROM 808 or NVRAM may also store other software components necessary for the operation of the computer 800 in accordance with the embodiments described herein.

According to various embodiments, the computer 800 may operate in a networked environment using logical connections to remote computing devices and computer systems through a network, such as a LAN, a WAN, the Internet, or any other networking topology known in the art that connects the computer 800 to remote computers. The chipset 804 includes functionality for providing network connectivity through a network interface controller ("NIC") 810, such as a gigabit Ethernet adapter. Multiple NICs 810 may be present in the computer 800, connecting the computer to other types of networks and remote computer systems.

The computer 800 may be connected to a mass storage device 812 that provides non-volatile storage for the computer. The mass storage device 812 may store system programs, application programs, other program modules, and data, which have been described in greater detail herein. The mass storage device 812 may be connected to the computer 800 through a storage controller 814 connected to the chipset 804. The mass storage device 812 may consist of one or more physical storage units. The storage controller 814 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 800 may store data on the mass storage device 812 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 812 is characterized as primary or secondary storage, or the like.

For example, the computer 800 may store information to the mass storage device 812 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 812 by detecting the physical states or characteristics of one or more particular locations within the physical storage units.

In addition to the mass storage device 812 described above, the computer 800 might have access to other computer-readable media to store and retrieve information, such as program modules, data structures, or other data. It should be appreciated by those skilled in the art that computer-readable media can be any available media that may be accessed by the computer 800, including computer-readable storage media and communications media. Communications media includes transitory signals.

Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 812 may store an operating system 816 utilized to control the operation of the computer 800. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 812 may store other system or application programs and data utilized by the computer 800. For instance, the mass storage device 812 might store the sending process 104 and the client language-specific conversion library 212A, both of which were described above.

In one embodiment, the mass storage device 812 or other computer-readable storage media may be encoded with computer-executable instructions that, when loaded into the computer 800, transform the computer from a general-purpose computing system into a special-purpose computer capable of implementing the embodiments described herein. These computer-executable instructions transform the computer 800 by specifying how the CPUs 802 transition between states, as described above. According to one embodiment, the computer 800 has access to computer-readable storage media storing computer-executable instructions that, when executed by the computer, perform the various routines and operations described herein.

The computer 800 may also include an input/output controller 818 for receiving and processing input from a number of input devices, such as a keyboard, a mouse, a touchpad, a touch screen, an electronic stylus, or other type of input device. Similarly, the input/output controller 818 may provide output to a display device, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for multi-programming-language service data optimization for remote clients have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for transmitting an object from a sending process to a receiving process, the computer-implemented method comprising executing instructions in a computer system to perform the operations of:
   receiving at the sending process data identifying a programming language used to program the receiving process;
   utilizing the data identifying the programming language used to program the receiving process to select one of a plurality of libraries for translating a sending process language-specific object maintained by the sending process to a receiving process language-specific object that is directly usable by the receiving process without deserialization;
   utilizing the selected library to translate the sending process language-specific object maintained by the sending process to the receiving process language-specific object; and
   streaming a binary large object form of the receiving process language-specific object to the receiving process.

2. The computer-implemented method of claim 1, wherein the sending process language-specific object is maintained in a memory according to a memory map defined by a programming language utilized to program the sending process.

3. The computer-implemented method of claim 2, wherein the receiving process language-specific object is maintained in a memory according to a memory map defined by the programming language utilized to program the receiving process.

4. The computer-implemented method of claim 3, wherein each of the plurality of libraries is configured to translate a first language-specific object formatted according to a first memory map to a second language-specific object formatted according to a second memory map.

5. The computer-implemented method of claim 4, wherein the sending process is configured to expose an application programming interface through which the receiving process can specify the data identifying the programming language used to program the receiving process.

6. A computer-readable storage medium having computer-executable instructions stored thereupon which, when executed by the computer, cause the computer to:
    maintain in a memory of the computer at least one sending process language-specific object;
    maintain a cache in the memory of the computer that stores a plurality of receiving process language-specific objects, each of the receiving process language-specific objects comprising a translation of the at least one sending process language-specific object;
    receive data from a receiving process identifying a programming language used to program the receiving process;
    utilize the data identifying the programming language used to program the receiving process to select one of the plurality of receiving process language-specific objects from the cache; and
    transmit the receiving process language-specific object selected from the cache to the receiving process.

7. The computer-readable storage medium of claim 6, wherein the receiving process language-specific object transmitted to the receiving process is usable by the receiving process without deserialization.

8. The computer-readable storage medium of claim 7, wherein the sending process language-specific object is formatted according to a memory map defined by a programming language utilized to program a sending process.

9. The computer-readable storage medium of claim 8, wherein the receiving process language-specific object transmitted to the receiving process is formatted according to a memory map defined by the programming language utilized to program the receiving process.

10. The computer-readable storage medium of claim 9, having further computer-executable instructions stored thereupon which, when executed by the computer, cause the computer to utilize one or more libraries to translate the sending process language-specific object from the memory map defined by the programming language utilized to program the sending process to the plurality of receiving language-specific objects.

11. A computing apparatus for one-way transmission of an object from a sending process to a receiving process, the apparatus comprising:
    at least one processor; and
    a computer-readable storage medium having computer-executable instructions stored thereon which, when executed on the at least one processor, causes the apparatus to
        execute a sending process configured to store a first object, the first object being stored according to a memory map defined by a programming language utilized to program the sending process,
        translate the first object into one or more second objects, the second objects formatted according to memory maps defined by programming languages other than the programming language utilized to program the sending process, and
        store each of the second objects in a language-specific queue, whereby a receiving process can dequeue a second object from a language-specific queue corresponding to a programming language utilized to program the receiving process and utilize the dequeued second object without deserialization.

12. The apparatus of claim 11, wherein one or more libraries are utilized to translate the first object into the one or more second objects.

13. The apparatus of claim 12, wherein the one or more libraries are configured to translate the first object from the memory map defined by the programming language utilized to program the sending process to the memory maps defined by the programming languages other than the programming language utilized to program the sending process.

14. A computer-implemented method for transmitting an object from a sending process to a receiving process, the computer-implemented method comprising executing instructions in a computer system to perform the operations of:
    storing a first object in a format defined by a programming language utilized to program the sending process;
    translating the first object to a second object, the second object in a format defined by a programming language utilized to program the receiving process and usable by the receiving process without deserialization; and
    causing the second object to be transmitted to the receiving process.

15. The computer-implemented method of claim 14, wherein causing the second object to be transmitted to the receiving process comprises storing the second object in a language-specific queue, whereby the receiving process can dequeue the second object from the language-specific queue and utilize the dequeued second object without deserialization.

16. The computer-implemented method of claim 14, wherein causing the second object to be transmitted to the receiving process comprises streaming a binary large object form of the second object to the receiving process.

17. The computer-implemented method of claim 14, further comprising storing the second object in a cache prior to causing the second object to be transmitted to the receiving process.

18. The computer-implemented method of claim 14, wherein the sending process is configured to expose an application programming interface (API) through which the receiving process can specify the programming language utilized to program the receiving process.

19. The computer-implemented method of claim 18, wherein the format defined by the programming language utilized to program the sending process comprises a memory map utilized by the programming language utilized to program the sending process.

20. The computer-implemented method of claim 19, wherein the format defined by the programming language utilized to program the receiving process comprises a memory map utilized by the programming language utilized to program the receiving process.

21. The computer-implemented method of claim 20, wherein translating the first object to a second object comprises:
- receiving data identifying the programming language used to program the receiving process by way of the API;
- selecting one of a plurality of libraries for translating the first object to the second object using the data received by way of the API; and
- utilizing the selected library to translate the first object to the second object.

* * * * *